(12) United States Patent
Hoganson

(10) Patent No.: US 9,650,214 B2
(45) Date of Patent: May 16, 2017

(54) MULTIPLE CARRIER HANDLING IN A PNEUMATIC TRANSPORT SYSTEM

(71) Applicant: TRANSLOGIC CORPORATION, Denver, CO (US)

(72) Inventor: Kenneth Michael Hoganson, Aurora, CO (US)

(73) Assignee: Translogic Corporation, Denver, CO (US)

( * ) Notice: Subject to any disclaimer, the term of this patent is extended or adjusted under 35 U.S.C. 154(b) by 64 days.

(21) Appl. No.: 14/202,545

(22) Filed: Mar. 10, 2014

(65) Prior Publication Data

US 2014/0270995 A1 Sep. 18, 2014

Related U.S. Application Data

(60) Provisional application No. 61/794,307, filed on Mar. 15, 2013.

(51) Int. Cl.
*B65G 51/40* (2006.01)
*B65G 51/26* (2006.01)
*B65G 51/32* (2006.01)

(52) U.S. Cl.
CPC ............ *B65G 51/26* (2013.01); *B65G 51/32* (2013.01)

(58) Field of Classification Search
CPC .................. B65G 51/12; B65G 51/24; B65G 51/40–51/46; B65G 51/22
USPC ......... 406/192, 181, 182, 183, 197; 700/230
See application file for complete search history.

(56) References Cited

U.S. PATENT DOCUMENTS

| | | |
|---|---|---|
| 2,043,293 A | 6/1936 | Jennings |
| 2,679,990 A | 6/1954 | Mathzeit et al. |
| 2,710,728 A | 6/1955 | Halpern |
| 2,773,658 A | 12/1956 | Van Otteren et al. |
| 2,797,057 A | 6/1957 | Sindzinski et al. |
| 2,815,182 A | 12/1957 | Mittag et al. |
| 2,850,249 A | 9/1958 | Uderstadt |
| 2,865,578 A | 12/1958 | Hennessy |
| 2,893,660 A | 7/1959 | Cook et al. |
| 2,943,814 A | 7/1960 | Mittag et al. |
| 2,970,791 A | 2/1961 | Hafner et al. |
| 2,997,253 A | 8/1961 | Mittag et al. |

(Continued)

FOREIGN PATENT DOCUMENTS

| | | |
|---|---|---|
| DE | 9010080 U1 | 9/1990 |
| EP | 2082980 A1 | 1/2009 |
| FR | 2803584 A1 | 7/2001 |

OTHER PUBLICATIONS

Aerocom GmbH & Co., Technical Bulletin: Empty Carrier Return Unit AC 3000 (CRU) Technical Information Manual, Mar. 4, 1996.

(Continued)

*Primary Examiner* — Joseph Dillon, Jr.
(74) *Attorney, Agent, or Firm* — Russell T. Manning; Marsh Fischmann & Breyfogle LLP

(57) ABSTRACT

A system, apparatus and method (i.e., utility) is provided for increasing the resource utilization of a pneumatic tube system (PTS). This utility allows for moving two or more carriers during a single air source cycle. That is, air pressure or vacuum during a single cycle of an air source may be utilized to move multiple carriers and thereby reduce the total number of cycles required to complete two or more transactions. Accordingly, the throughput of the PTS may be increased.

8 Claims, 15 Drawing Sheets

(56) References Cited

U.S. PATENT DOCUMENTS

| | | | |
|---|---|---|---|
| 3,055,611 | A | 9/1962 | Stout et al. |
| 3,055,612 | A | 9/1962 | Stout et al. |
| 3,148,845 | A | 9/1964 | Buchwald et al. |
| 3,219,989 | A | 11/1965 | Kuhrt et al. |
| 3,223,353 | A | 12/1965 | Kuhrt et al. |
| 3,236,475 | A | 2/1966 | Mach et al. |
| 3,238,515 | A | 3/1966 | Schrader et al. |
| 3,265,325 | A | 8/1966 | Buchwald et al. |
| 3,295,662 | A | 1/1967 | Crosby et al. |
| 3,332,639 | A | 7/1967 | Joy |
| 3,333,787 | A | 8/1967 | Voitas et al. |
| 3,361,384 | A | 1/1968 | Thorburn |
| 3,408,113 | A | 10/1968 | Bouladon |
| 3,507,460 | A | 4/1970 | Norman et al. |
| 3,627,231 | A | 12/1971 | Kalthoff |
| 3,711,038 | A | 1/1973 | Van Otteren |
| 3,813,058 | A | 5/1974 | Smith et al. |
| 3,817,476 | A | 6/1974 | Martin |
| 3,829,042 | A | 8/1974 | Torochkov et al. |
| 3,892,372 | A | 7/1975 | Hauber |
| 3,910,523 | A * | 10/1975 | Alexandrov ............ B65G 51/08 406/105 |
| 3,951,461 | A | 4/1976 | De Feudis |
| 3,980,024 | A * | 9/1976 | Futer ...................... B61B 13/10 104/138.1 |
| 4,037,805 | A | 7/1977 | Alexandrov et al. |
| 4,058,274 | A | 11/1977 | Hochradel et al. |
| 4,084,770 | A | 4/1978 | Warmann |
| 4,240,768 | A * | 12/1980 | Carstens ................ B65G 51/10 406/105 |
| 4,245,935 | A * | 1/1981 | Carstens ................ B65G 51/28 406/105 |
| 4,256,418 | A | 3/1981 | Stangl |
| 4,354,775 | A | 10/1982 | Jalas |
| 4,371,294 | A * | 2/1983 | Sakamoto ............. B65G 53/30 137/565.33 |
| 4,395,164 | A | 7/1983 | Beltrop et al. |
| 4,437,797 | A | 3/1984 | Kardinal |
| 4,509,123 | A | 4/1985 | Vereen |
| 4,516,888 | A | 5/1985 | Kardinal |
| 4,529,335 | A | 7/1985 | Hilbert et al. |
| 4,563,112 | A | 1/1986 | Mokuya et al. |
| 4,630,216 | A | 12/1986 | Tyler et al. |
| 4,646,245 | A | 2/1987 | Prodel et al. |
| 4,766,547 | A | 8/1988 | Modery et al. |
| 4,786,229 | A | 11/1988 | Henderson |
| 4,831,540 | A | 5/1989 | Hesser |
| 4,941,181 | A | 7/1990 | Igarashi et al. |
| 4,958,716 | A | 9/1990 | Matsuo et al. |
| 4,971,481 | A | 11/1990 | Foreman |
| 4,974,166 | A | 11/1990 | Maney et al. |
| 5,038,290 | A | 8/1991 | Minami |
| 5,097,421 | A | 3/1992 | Maney et al. |
| 5,153,842 | A | 10/1992 | Dlugos, Sr. et al. |
| 5,165,826 | A | 11/1992 | Egbert |
| 5,166,884 | A | 11/1992 | Maney et al. |
| 5,190,428 | A | 3/1993 | Bryant et al. |
| 5,196,846 | A | 3/1993 | Brockelsby et al. |
| 5,217,328 | A | 6/1993 | Lang |
| 5,225,990 | A | 7/1993 | Bunce et al. |
| 5,234,292 | A | 8/1993 | Lang |
| 5,237,931 | A | 8/1993 | Riedl |
| 5,253,590 | A * | 10/1993 | Marusak ................ B61B 13/10 104/138.1 |
| 5,260,694 | A | 11/1993 | Remahl |
| 5,267,173 | A | 11/1993 | Tanizawa et al. |
| 5,375,691 | A | 12/1994 | Wirtz |
| 5,386,364 | A | 1/1995 | Tyler |
| 5,434,790 | A | 7/1995 | Saka et al. |
| 5,436,611 | A | 7/1995 | Arlinghaus, Jr. |
| 5,562,367 | A | 10/1996 | Scott |
| 5,655,677 | A | 8/1997 | Fratello et al. |
| 5,661,743 | A | 8/1997 | Nagai |
| 5,682,820 | A | 11/1997 | Arata |
| 5,712,789 | A | 1/1998 | Radican |
| 5,725,124 | A * | 3/1998 | Bustos ..................... E04H 3/02 221/211 |
| 5,735,644 | A | 4/1998 | Grosswiller et al. |
| 5,864,485 | A | 1/1999 | Hawthorne et al. |
| 5,867,388 | A | 2/1999 | Okumura et al. |
| 5,959,568 | A | 9/1999 | Woolley |
| 5,966,309 | A | 10/1999 | O'Bryan et al. |
| 6,030,152 | A | 2/2000 | Steele |
| 6,068,428 | A | 5/2000 | Nair et al. |
| 6,076,652 | A | 6/2000 | Head, III |
| 6,138,058 | A | 10/2000 | Van Antwerp, Jr. et al. |
| 6,146,057 | A | 11/2000 | Gromley et al. |
| 6,292,710 | B1 | 9/2001 | Bonnet |
| 6,356,802 | B1 | 3/2002 | Takehara et al. |
| 6,437,272 | B2 | 8/2002 | Tamamoto et al. |
| 6,477,442 | B1 | 11/2002 | Valerino, Sr. |
| 6,516,239 | B1 | 2/2003 | Madden et al. |
| 6,539,360 | B1 | 3/2003 | Kadaba |
| 6,659,693 | B1 | 12/2003 | Perkins et al. |
| 6,665,586 | B1 | 12/2003 | Ball et al. |
| 6,672,808 | B1 | 1/2004 | McIntyre et al. |
| 6,702,150 | B2 | 3/2004 | Sumetzberger |
| 6,711,463 | B2 | 3/2004 | Tozuka et al. |
| 6,747,560 | B2 | 6/2004 | Stevens, III |
| 6,762,382 | B2 | 7/2004 | Danelski |
| 6,878,896 | B2 | 4/2005 | Braginsky et al. |
| 6,887,358 | B2 | 5/2005 | Elger |
| 6,911,910 | B2 | 6/2005 | Sansone et al. |
| 6,939,088 | B2 | 9/2005 | Farrell |
| 6,950,724 | B2 | 9/2005 | Mileaf et al. |
| 6,959,229 | B2 | 10/2005 | Eidemiller |
| 7,079,913 | B2 | 7/2006 | Kato et al. |
| 7,092,788 | B2 | 8/2006 | Brixius et al. |
| 7,104,734 | B2 | 9/2006 | Smith et al. |
| 7,136,721 | B2 | 11/2006 | Sano et al. |
| 7,151,980 | B2 | 12/2006 | You et al. |
| 7,196,627 | B2 | 3/2007 | Rommelmann et al. |
| 7,243,002 | B1 | 7/2007 | Hoganson et al. |
| 7,326,005 | B1 * | 2/2008 | Castro .................... B65G 51/22 406/19 |
| 7,328,084 | B1 | 2/2008 | Hoganson et al. |
| 7,363,106 | B1 | 4/2008 | Hoganson et al. |
| 7,953,515 | B2 | 5/2011 | Hoganson et al. |
| 8,447,427 | B2 | 5/2013 | Hoganson et al. |
| 8,565,915 | B2 | 10/2013 | Dillon |
| 8,596,932 | B2 | 12/2013 | Hoganson et al. |
| 8,641,329 | B2 | 2/2014 | Barrios |
| 2001/0056311 | A1 | 12/2001 | Valerino, Sr. |
| 2011/0097239 | A1 | 4/2011 | Schmatz |

OTHER PUBLICATIONS

Telecom bedrifscommunicatie b.v. buispostsystemen (pneumatic tube systems)—tube-mail systems, Technical Manual, Radio Controlled Identifcation, Aug. 24, 1999.

* cited by examiner

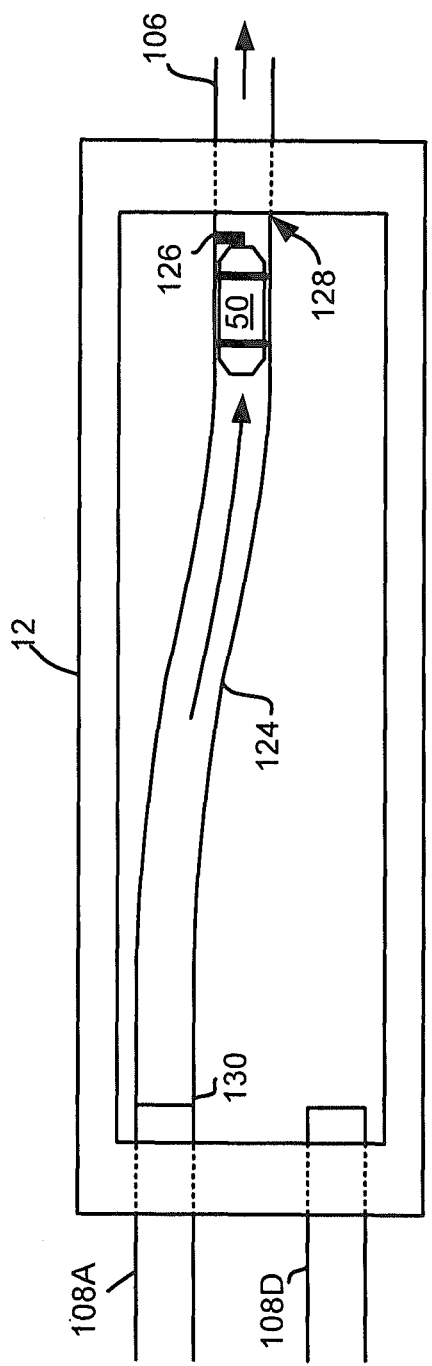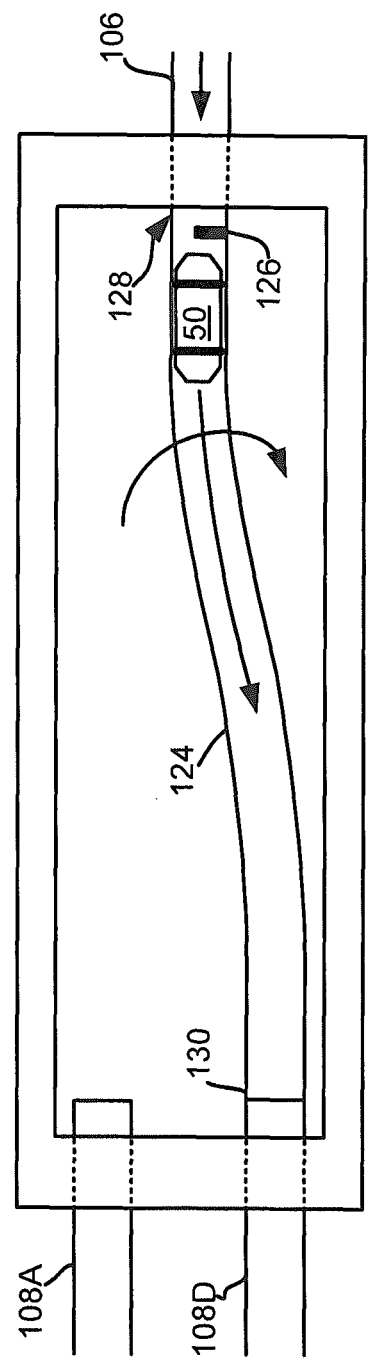
Fig. 4B
Fig. 4C

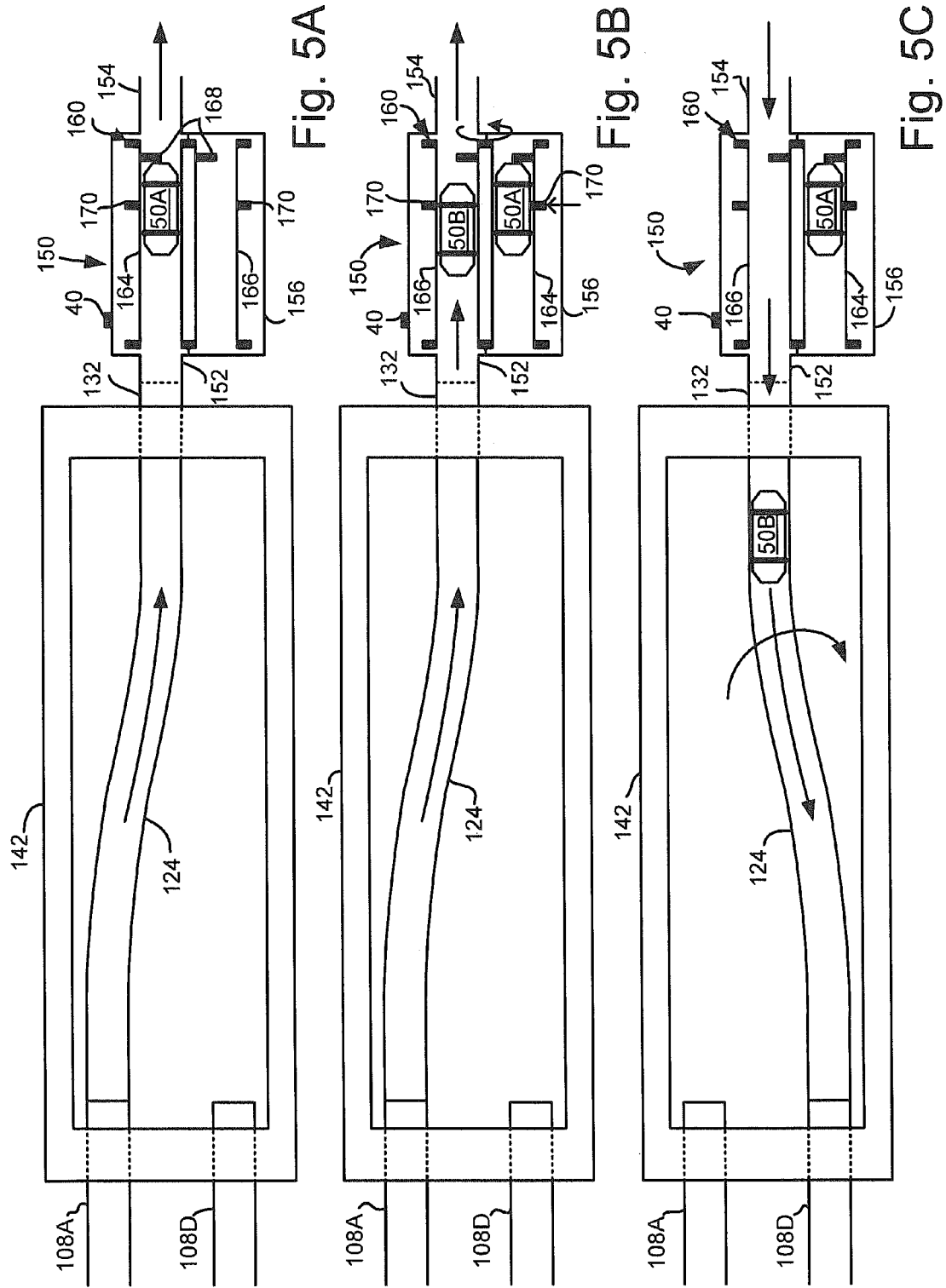

MULTIPLE CARRIER HANDLING IN A PNEUMATIC TRANSPORT SYSTEM

CROSS REFERENCE

This application claims the benefit of the filing date of U.S. Provisional Application No. 61/794,307 having a filing date of Mar. 15, 2013, the entire contents of which is incorporated herein by reference.

FIELD

The presented disclosure relates generally to pneumatic tube systems. More specifically, the disclosure provides systems, apparatuses, and methods for use in handling multiple pneumatic carriers during a single transport cycle.

BACKGROUND

Pneumatic tube systems (PTS) are a well-known means for the automated transport of materials between, for example, an origination location and any one of a plurality of destination locations. A typical PTS includes a number of pneumatic tubes interconnected in a network to transport carriers between user stations. Various air sources/blowers and transfer units provide the force and path control means, respectively, for moving the carriers through and from tube-to-tube within the system. Generally, transfer units move or divert pneumatic carries from a first pneumatic tube to a second pneumatic tube in order to route the pneumatic carrier between locations, such as stations, in the PTS.

The pneumatic tubes that form a network of pathways may be arranged in any manner. Many systems include a number of individual stations that are interconnected to the network by a single pneumatic tube. The single pneumatic tube transfers carriers to and from the station under pressure and vacuum and is connected to a transfer device. Such transfer devices allow for redirecting pneumatic carriers to one or more additional pneumatic tubes. In this regard, carries may be routed between different stations. It will be appreciated that the number of stations and distances between stations in the network may be quite large. For instance, many large facilities (e.g., hospitals) incorporate pneumatic tube systems having dozens or even hundreds of user stations where the distance between the most distally located pair of stations may exceed several hundred yards or even several miles.

Large PTSs often require a complex network of interconnected tubes. Further, to provide functionality to separate portions of such large systems, most such systems are divided into multiple zones. Typically, each zone includes a set of stations that receive pneumatic pressure and/or vacuum from a common air source. For instance, a transfer device that receives pressure and/or vacuum from the common air source may connect to each station of such a zone. This transfer device permits carriers received from pneumatic tubes connected to each station to be transferred to another pneumatic tube associated with one of the other stations (e.g., intra-zone transfer) and/or transferred to a different zone (e.g., inter-zone transfer).

During a transaction, a pneumatic carrier is placed in a first station and a destination (e.g., second station) is provided for the carrier. A pneumatic tube connected to the station is then fluidly connected to the air source by aligning various transfer devices to connect pneumatic tubes between the air source and the station. At this time, the air source typically applies a vacuum to the pneumatic tube, which moves the carrier out of the station and into the pneumatic tube system. The carrier proceeds under vacuum until it reaches a turn-around location where the carrier is stopped. Various transfer devices are then realigned to connect pneumatic tubes, which provide a pneumatic path toward the ultimate destination of the pneumatic carrier. At this time, the air source typically provides positive air pressure to propel the pneumatic carrier from the turn-around location towards its ultimate destination through the realigned transfer devices and connected pneumatic tubes. If the ultimate destination is in the current zone (i.e., an intra-zone transfer) the carrier proceeds to its ultimate destination. If the ultimate destination is in a different zone (i.e., inter-zone transfer) the carrier proceeds to an adjacent zone for further processing. During each air source cycle (e.g., application of pressure or vacuum) one carrier is moved from one location to a second location. Thus, it requires two air source cycles to move one carrier from an originating station into the PTS and to initiate movement of the carrier towards its ultimate destination.

SUMMARY

Provided herein are systems, apparatuses and methods for increasing the resource utilization of a pneumatic tube system (PTS). The systems, apparatuses and methods (i.e., utilities) allow for moving two or more carriers during a single air source cycle. In this regard, air pressure or vacuum during a single cycle of an air source may be utilized to move multiple carriers and thereby reduce the total number of cycles required to complete two or more transactions. Accordingly, the throughput of the PTS may be increased.

According to a first aspect, a utility is provided for use moving one or more pneumatic carriers during a first air source cycle or blower cycle where the carriers may be temporarily stored and delivered during a second blower cycle. The utility includes a transfer unit or diverter that allows for selectively interconnecting at least a first pneumatic port (e.g., head-end port) with any of a plurality of inlet/outlet ports. Typically, such a diverter will include a transfer tube having a first end connected to the head-end port and a second end that is selectively connectable to any one of the inlet/outlet ports. An internal bore of the transfer tube is sized to permit transit of a pneumatic carrier there through. The utility also includes a sequencer or carrier handling device that is operative to selectively receive and store multiple carriers. The carrier handling device includes a housing having an air source port that is connectable to an air source, which is operative to provide air flow in first and second directions through the air source port, carrier handling device and diverter. The carrier handling device further includes a carrier port connected to the head-end port of the diverter. In this regard, carriers passing through the diverter may be received into the carrier handling device via the carrier port. The diverter and carrier handling device may be separate units or an integral unit. In the latter regard, the head-end port and carrier port may be a common element. Disposed within the carrier handling device between the air source port and carrier port are at least first and second carrier docks that are adapted to receive at least first and second carriers. In one arrangement, the carrier handling docks are operative to selectively engage the carrier such that the carriers are maintained in a fixed positional relationship with the carrier dock.

In one arrangement, the carrier handling docks of the carrier handling device are disposed in a serial arrangement. In such an arrangement, each carrier dock may further include a bypass duct to selectively divert air flow around a pneumatic carrier, when a pneumatic carrier is disposed within the carrier dock. Such a bypass duct may further include one or more valves that allow selectively opening and closing an airflow path through the bypass duct.

In another arrangement, the carrier handling docks are disposed in parallel. In such an arrangement, the carrier handling docks may be disposed between first and second ends of a rotating carriage. In this arrangement, the rotating carriage may be operative to selectively align the carrier handling docks with the carrier port. Accordingly, when carrier handling dock is aligned with the carrier port it may receive and/or dispatch a carrier from/to the diverter and, hence, the pneumatic tube system.

In a further arrangement, the utility may include a reader or interrogator that is operative to read/interrogate identification elements on or in pneumatic carriers received by the carrier handling device and or diverter. Accordingly, a controller may utilize information received from such identification elements to identify transaction records associated with the carriers and/or determine destination locations for the carriers.

In another aspect, a utility is provided for use in operating a pneumatic tube system. The utility includes operating an air source of a pneumatic tube system to provide airflow in a first direction. That is, the air source may be operated during a first cycle to provide positive or negative air pressure. The first direction airflow may be applied to at least first and second carrier stations (e.g., sequentially) pneumatically connected to the air source. Such airflow may only be applied to stations identified as having a carrier staged for dispatch into the pneumatic tube system. The sequential application of the first direction airflow, during a single air source cycle, allows for moving first and second, or more, carriers from their pneumatic carrier stations to a carrier handling device, which is disposed within the pneumatic tube system between the air source and the carrier stations.

The carriers may subsequently be received by the carrier handling device. Likewise, the carriers may be temporarily stored within the carrier handling device. At such time, one or more components of the pneumatic tube system may be realigned to establish a pneumatic path between the carrier handling device and a destination station of one or more of the carriers. At such time, a second direction airflow may be established to displace the carriers out of the carrier handling device and back into the pneumatic tube system, where they may proceed toward their ultimate destinations.

Receiving multiple carriers may include receiving a first carrier in a first carrier dock and receiving a second carrier within the second carrier dock. In one arrangement, the first carrier dock may be aligned with a carrier receiving port of the carrier handling device to receive the first carrier. Likewise, a second carrier dock may be aligned with the carrier receiving port to receive the second carrier. In such an arrangement, the utility may include rotating a carriage within the carrier handling device to align the carrier handling docks.

Sequential application of the first direction air flow to multiple carrier stations may include the realignment of one or more pneumatic tube system components during application of the first airflow. In this regard, a transfer unit connected to multiple stations may be realigned after a first carrier from a first carrier station passes through the transfer unit to apply the first direction air flow to a second carrier station containing a second carrier. In such an arrangement, the first and second carriers may be in transit simultaneously.

Once first and second or additional carriers are received at the carrier handling device, the utility may be operative to identify destination locations for the carriers. Such destination information may be identified at the time the carriers are staged for delivery within their respective carrier stations. Alternatively, the utility may read or interrogate identification elements disposed on the carriers and/or contents of the carriers. Such identification elements may provide destination information or identification that allows for correlating the carrier/contents with a transaction record that includes destination information. Based on the destination information of the multiple carriers within the carrier handling device, carriers having an at least partially overlapping pneumatic path to their respective destinations may be staged for co-delivery. That is, pneumatic components may be aligned to provide the at least partially overlapping pneumatic path and a second airflow may be established to displace these carriers from the carrier handling device. The carriers may be sequentially released to provide a desired spacing there between. In any arrangement, any or all of the carriers received by the carrier handling device may be displaced from the carrier handling device during application of the second direction airflow. That is, one or all of the carriers may be displaced during a second air source cycle.

In another aspect, a utility is provided for use in scheduling carrier dispatches from carrier stations of a pneumatic transport system during a single blower cycle. In such a utility, the carrier stations are typically connectable to a common air source. Initially, an output is generated at two or more carrier stations connected to a common air source. The output identifies an upcoming dispatch time when carriers staged for dispatch will be launched into the system. At the dispatch time, the utility identifies which of the stations includes a carrier staged for dispatch and sequentially applies a first direction air flow to each of the stations in order to move the staged carriers from the stations. The carriers move in the first direction air flow to a carrier handling device that is disposed between the air source and the stations. Once received, during a common air source cycle, the carrier may be dispatched from the carrier handling device during a second air source cycle.

BRIEF DESCRIPTION OF THE DRAWINGS

For a more complete understanding of the present disclosure and further advantages thereof, reference is now made to the following detailed description taken in conjunction with the drawings in which:

FIGS. 4B and 4C illustrates first and second sides view of the transfer unit of FIG. 4A.

FIGS. 5A-5C illustrate side views of a transfer unit and carrier sequencing device.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 1:
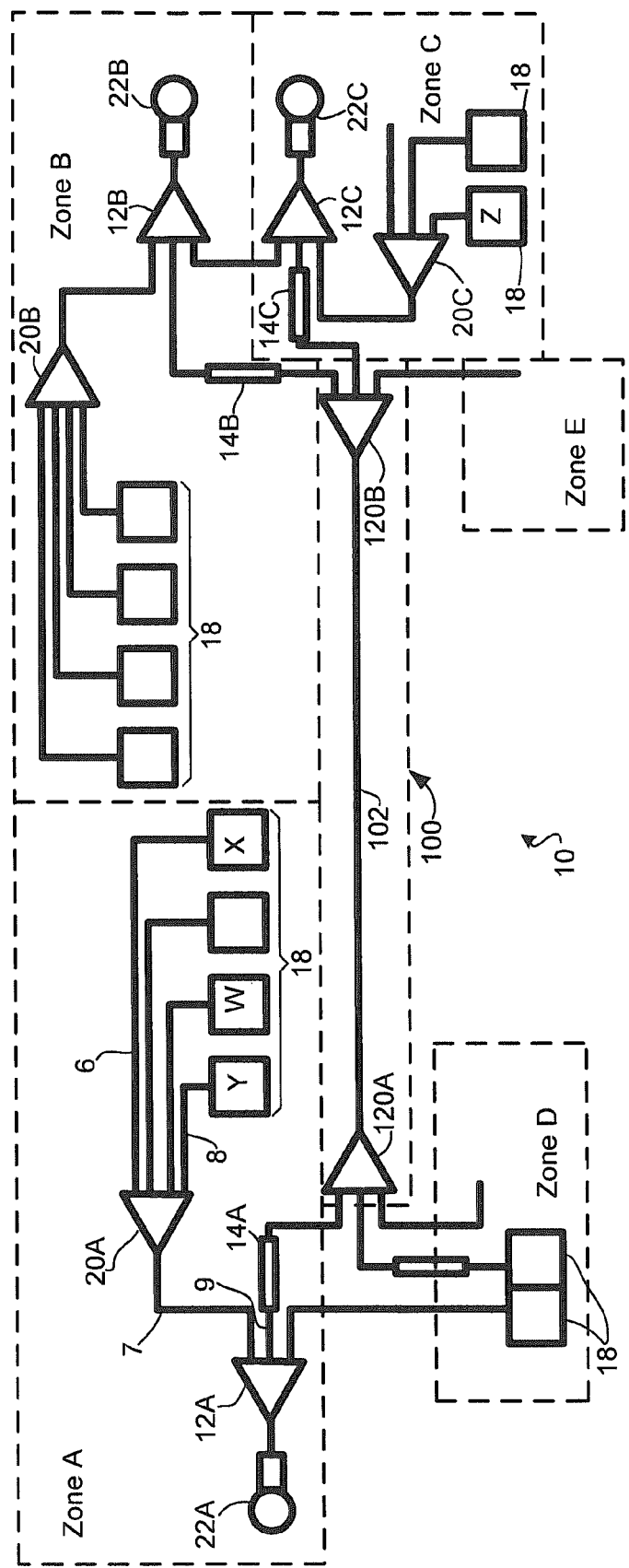
FIG. 1 illustrates one embodiment of a pneumatic tube system.

Disclosed in FIG. 1 is an exemplary system diagram for a pneumatic carrier system 10. The system is divided in to various zones each of which includes various components. For example, Zone A includes components 12A, 20A etc. Unless discussing a component of a specific zone (e.g., component 12A), the common components of each zone are generally referred to without the zone suffix (e.g., component 12 refers to component 12A, 12B etc.). In general, the pneumatic carrier system 10 transports pneumatic carriers between various user stations 18, each such transport operation being referred to herein as a "transaction". At each of the user stations 18, a user may insert a carrier, select/enter a destination address/identification and/or a transaction priority, and then send the carrier. The system determines a path to route the carrier and begins directing the carrier through the system.

Interconnected with most stations 18 is a pass-through transfer unit 20 which orders carriers arriving through different tubes from different stations 18 into a single pneumatic tube or diverts carriers a carrier arriving through the single tube into one of the different tubes connected to the stations. The pass-through transfer unit is connected by the single tube to a vacuum turn-around transfer unit 12 and a blower 22 that provides the driving pneumatic force for carrier movement. The turn-around transfer unit 12 receives a carrier trough one of multiple pneumatic tubes, holds the carrier therein and redirects the carrier back out one of the multiple tubes once realigned, as is more fully discussed below. A set of transfer units 12, 20, a blower 22 and one or more stations 18 typically define a single zone (e.g., zones A, B and C). In the present embodiment, the turn-around transfer unit 12 is a point of connection to each zone. However this is not a requirement.

Within the system 10 itself, one or more devices are employable for ordering and routing carriers to their selected destinations. One type of device is a traffic control unit (TCU) 14 which is employable to receive, temporarily store and controllably release one or more carriers. Such functionality allows, for example, holding a carrier until a path through a subsequent portion of the system becomes available. Often, a carrier is temporarily parked in a TCU under power of a first blower to await the availability of a downstream path. This frees the first blower to perform additional transactions while the carrier is parked and/or allows a blower of an adjacent zone to take over processing of the carrier transaction. Typically the TCUs 14 operate as linear storage devices, e.g., on a first in first out (FIFO) basis.

Figure 2:
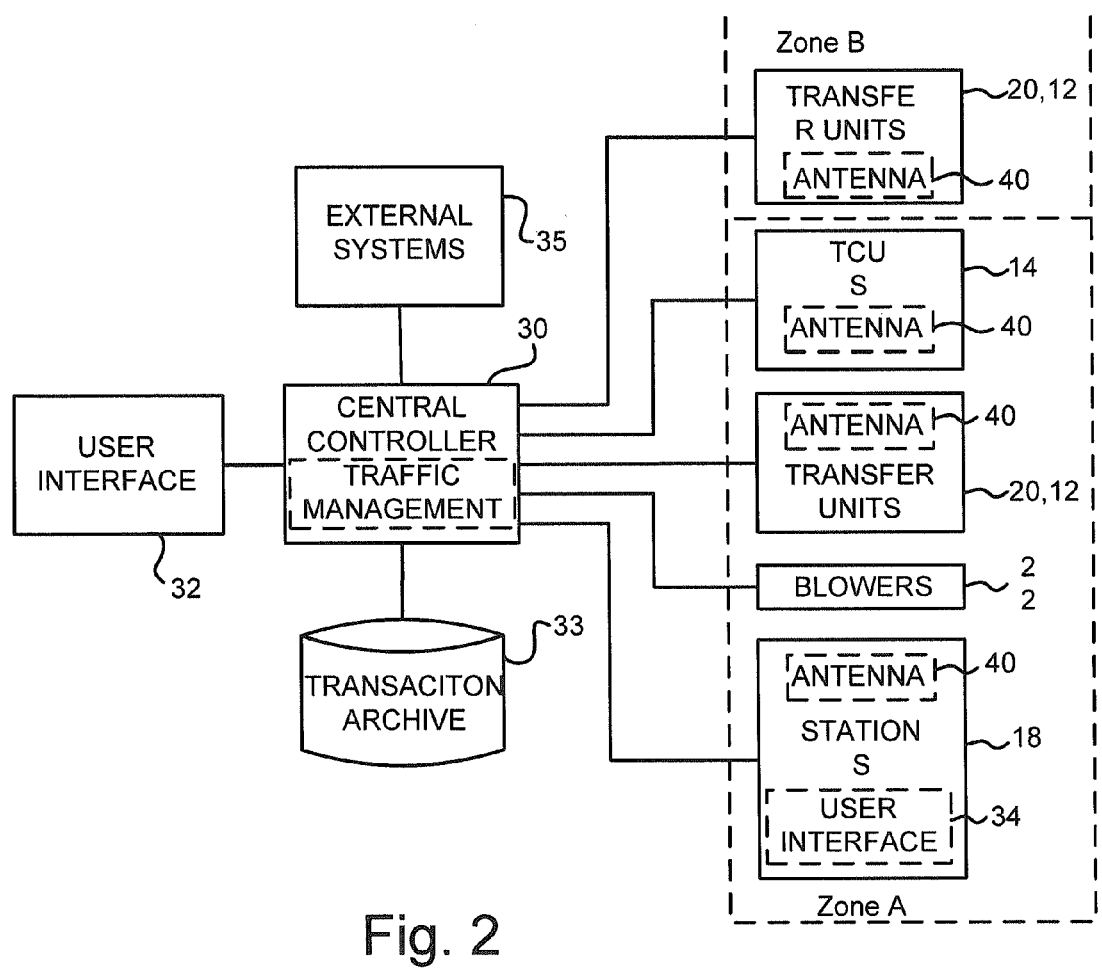
FIG. 2 illustrates a control system for use in controlling a pneumatic tube system.

All of the components described in FIG. 1 electronically connect to a central controller which controls their operation. Disclosed in FIG. 2 is an electrical system diagram for the pneumatic carrier system 10 described herein. Providing centralized control for the entire pneumatic carrier system 10 is a system central controller (SCC) 30. The SCC 30 may include a digital processor and memory. SCC 30 may be configured as one or more programmable digital computers. Connectable to the SCC 30 may be one or more user interfaces 32, 34 through which a system user may monitor the operations of the system and/or manually enter one or more commands to control its operation. Typically, at least one user interface 34 is located at or within an area serviced by stations 18. For example, in a medical facility application, one or more user stations 18 and at least one user interface 34 may be provided within each emergency room, laboratory, nursing station, etc. In this regard, the user interface may be contained in the stations 18, or be stand-alone units.

Each of the components described above in relation to FIG. 1 may include one or more electrical and/or electro-mechanical components which provide for the physical movement of a carrier within the system 10 and/or the obtainment/provision of information relating to the location of the carriers within the system 10. In this regard, the components shown in FIG. 2 are representations of the various electrical and electro-mechanical systems that may be employed by the pneumatic carrier system 10. Although in FIG. 2 they are represented single blocks, one skilled in the art will realize that the block for each type of device represents the electronics for a number of the same or similar type of components positioned throughout the system which provides for its operation. In various embodiments, each of the user stations 18, TCUs 14, transfer devices 20, 12 and/or pneumatic tubes may incorporate antenna devices/readers 40 configured to read or energize and retrieve identification information from identification devices such as bar codes, ID chips, etc. that may be incorporated into each of the carriers. Such a system is set forth in co-assigned U.S. Pat. No. 7,243,002, the contents of which are incorporated herein by reference.

Referring again to the electrical system diagram of FIG. 2, it may be seen that various transfer units 12, 20, and blowers 22 are also electrically connectable to the SCC 30. Through these connections, SCC 30 may send command signals to these devices so that they are actuated and operating at particular times and in particular sequences to affect the completion of the various carrier transactions. Other signals exchanged may include various monitoring signals that indicate the devices are operating as desired.

The SCC 30 is further connectable to a transaction archive 33, or database, which is configured to store transaction information for carriers moving within the system 10. The transaction information may include identification information for carriers moving through the system and destination information entered by a system user. Further, the transaction information may include sender identification, recipient identification, security information (e.g., PIN numbers) and/or location information obtained via tracking inputs received from antenna devices/readers 40 located at user stations 16, 18, TCUs 14, pneumatic tubes or other components along the travel path of a given carrier. The external systems 35 connected may depend on the purpose of the pneumatic carrier system 10. For example, the external systems 35 may include a lab information system, a pharmacy information system, a patient information system, a security information system and/or messaging systems (e.g., email, text, paging, or wireless system, etc.).

Figure 3:
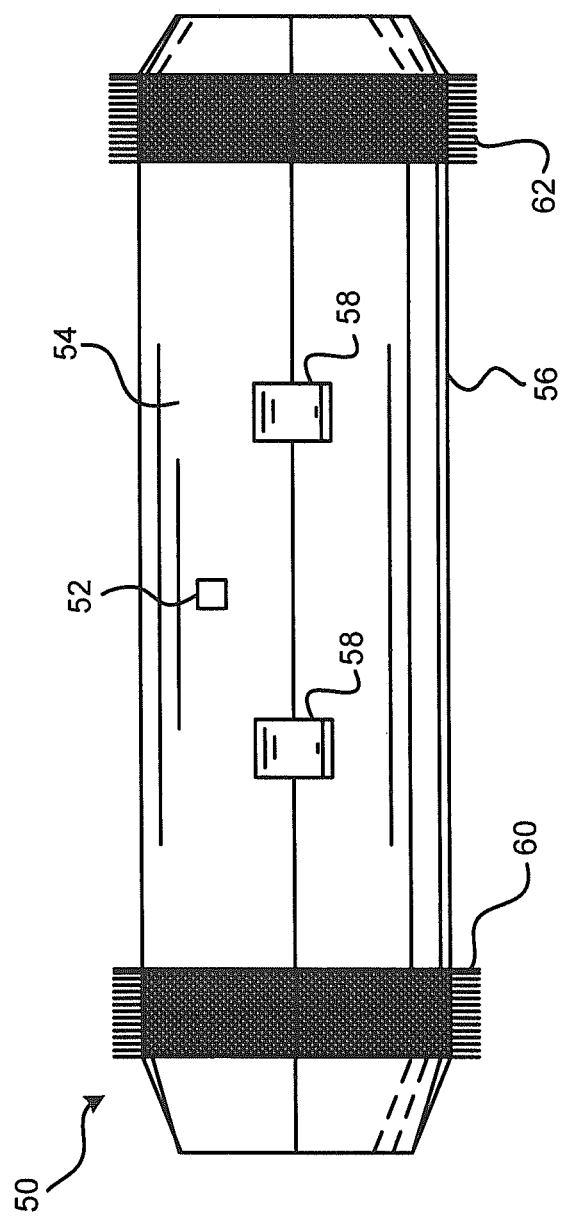
FIG. 3 illustrates one embodiment of carrier for use in a pneumatic tube system.

One type of carrier 50 that may be utilized with the system 10 is illustrated in FIG. 3 and includes first and second shell members 54 and 56 that collectively define an enclosed space for use in carrying materials as they are transported through the system 10. These shell members 54, 56 are adjoinably cylindrical in cross-section for use in correspondingly cylindrical pneumatic tubes of the system 10. The shell members 54 and 56 may be pivotably interconnected by a hinge member (not shown), and latches 58 may be provided for securing the first shell member to the second shell member in a closed configuration. Also included as part of the carrier 50 are wear bands 60, 62. The wear bands 60, 62 are sized to snuggly fit within the inside surface of the pneumatic tubes in order to substantially block the passage of air across a carrier 50 within such a pneumatic tube. Accordingly, this blockage results in a pressure differential across the carrier 50 that results in the carrier 50 being pushed or drawn through the pneumatic tube. In the illustrated embodiment, an ID chip 52 (e.g., RFID, bar code, etc) is attached to one of the shell members 54. In this regard, antenna device/readers may be incorporated into system components and/or pneumatic tubes within the system 10 to monitor the location and/or translocation of the carrier through the system. In a further embodiment, an ID chip or element may be attached to an item (e.g., payload) disposed within the interior of the carrier 50. In such an arrangement, the carrier itself may or may not include such an ID chip. What is important is that the carrier or its contents may be identified as they pass through the system. Accordingly, transaction information (e.g., destination information) associated with the identification read from the carrier or its contents may be cross-referenced at multiple locations throughout the system. Such cross-referencing may prevent the misdirection or erroneous delivery of a carrier transaction.

System Operation

Referring again to FIG. 1, and Zone A, an exemplary intra-zone transfer between station 18X and stations 18Y is described. Initially, a user inserts a carrier into station 18X and requests transfer to station 18Y. The system controller operates the blower 22A of Zone A to provide vacuum to station 18X. This requires aligning the internal tubing of the turn-around transfer unit 12A and the transfer unit 20A to the pneumatic tube 6 connecting station 18*x* to the transfer unit 20A. Once aligned, the blower provides vacuum and the carrier is drawn into the pneumatic tube 6. The carrier passes through the pass-through transfer unit 20A and is received in the turn-around transfer unit 12A, which stops and holds the carrier during realignment. That is, the system controller aligns the internal tubing of the pass-through transfer unit 20A with a pneumatic tube 8 interconnected to station 18Y. The blower 20A then provides pressure to the carrier expelling the carrier out of the turn-around transfer unit 12 through the pass-through transfer unit 20A, into tube 8 and to station 18Y.

An exemplary inter-zone transfer is discussed in relation to movement of a carrier from station 18X in Zone A to station 18Z in Zone C. Again, to provide vacuum to station 18X, the system controller aligns the internal tubing of the turn-around transfer unit 12 and pass-through transfer unit 20A to provide a continuous pneumatic path between station 18X and the turn-around transfer unit 12A. Accordingly, the vacuum may be applied to these aligned tubes to draw a carrier from station 18X into the turn-around transfer unit 12A. At this time, internal tubing of turn-around transfer unit 12A may be aligned with the output tube 9. Once aligned, blower 22 provides positive pressure behind the carrier, which displaces the carrier from the turn-around transfer unit 12A and into tube 9. The carrier is received by TCU 14A where it awaits delivery into the inter-zone transfer unit 100 which interconnects different zone of the pneumatic tube system. Alternatively, the carrier may pass directly through the TCU 14A if all downstream components are aligned. As shown, an inter-zone transfer unit 100 connects Zone A and Zone C. The inter-zone transfer unit 100 utilizes opposing pass-through transfer units 120A, 120B having head ends (e.g., single port inlets) connected by a single connecting tube 102, which may be of considerable length. The output ends of the opposing pass-through transfer units 120A, 120B are each selectively connectable to multiple tubes that may be connected to different zones and/or stations. Other embodiments may use dedicated one-way transfer tubes between different zones as disclosed by co-owned U.S. Pat. No. 7,243,002 as incorporated above. In the present example, the opposing pass-through transfer units are aligned to interconnect Zone A with Zone C.

The carrier exits the TCU 14A and is directed through the interzone transfer unit 100 under positive pressure provided by the blower 22A of zone A and proceeds until it is received by a TCU 14C in Zone C. At this time, the blower 22A of Zone A has completed its part of the transaction and may be utilized to perform other pending transactions for Zone A. The blower 22C of Zone C provides vacuum to the carrier disposed in the TCU 14C to move the carrier into the turn-around transfer unit 12C. The turn-around transfer unit 12C is then realigned to provide the carrier to transfer unit 20C, which is aligned with desired station 18Z. Accordingly, the blower 22C may provide positive pressure to move the carrier out of the turn-around transfer 12C, through the transfer unit 20C and to station 18Z.

While providing an effective transfer between first and second stations in either intra-zone transfer or inter-zone transfer, the inventor has recognized that the system has several drawbacks. For instance, in a case where two carriers are awaiting transport in a single zone (e.g., stations 18X and 18Y each have a carrier awaiting transport), processing of one of the carriers must await retrieval and delivery of the other carrier. In this example, the blower 22A of Zone A initially processing a carrier in station 18X must complete two cycles before processing a carrier awaiting delivery in station 18Y. For example, the blower 22A must execute a vacuum cycle to move the carrier in station 18X to the turn-around transfer unit 12A and then execute a pressure cycle to move the carrier out of the turn-around transfer unit 12A towards its destination. Until these two cycles are completed, the processing of carrier in station 18Y is delayed.

Multiple Carrier Handling

Aspects of the presented inventions are based upon the realization that the air source or blower of a pneumatic tube system has adequate power to move multiple carriers in a single transport cycle (e.g., vacuum or pressure). Referring to the previous example, this would allow moving both carriers located in stations 18X and 18Y out of those stations to the turn-around transfer unit 12A, during a single vacuum blower cycle. Likewise, both carriers may be moved out of the turn-around transfer unit 12A during a single pressure blower cycle. However, to effect movement of multiple carriers during a single blower cycle, the system requires a means to handle multiple carriers received at the turn-around location.

Figure 4A:
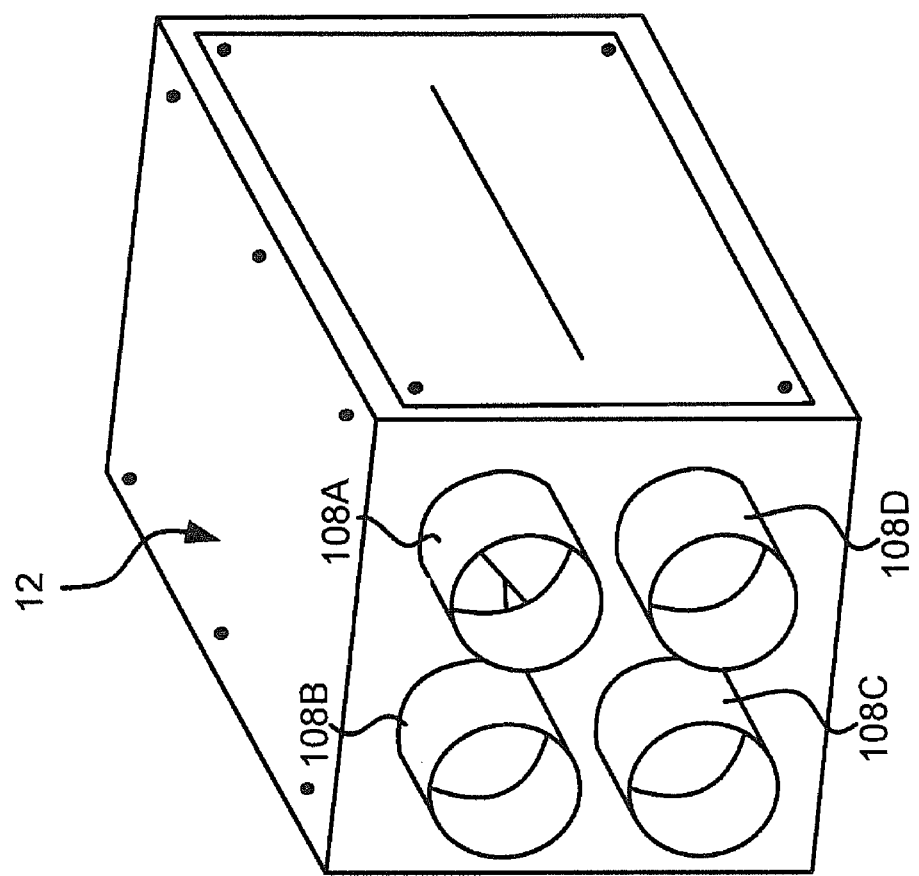
FIG. 4A illustrates a perspective view of a transfer unit that transfers a single tube to one of four interconnecting tubes.

FIGS. 4A, 4B and 4C illustrate a perspective and side view of a prior art turn-around transfer unit 12. As shown, the transfer unit 12 is a diverting unit that allows for transferring a received carrier between any one of four inlet/outlet four ports 108A-108D that enter into one end of the transfer unit 12. An air source port 106 is disposed on an opposite end of the transfer unit 12, which is connectable to an air source/blower that provides bi-directional air flow. Though discussed in relation to a four port device, it will be appreciated that other devices may utilize more or fewer inlet/outlet ports. To effect transfer of a received carrier between two of the inlet/outlet ports, the transfer unit 12 includes a transfer tube 124. As shown in FIG. 4B, the transfer tube 124 is a bent or offset tube that may be selectively positioned between the head end or air source port 106 connected to the air source and any one of the four inlet/outlet ports, each of which is connected to separate tubes that may be connected to different zones, stations etc. In this regard, the transfer tube 124 is typically a curved tube having a head end 128 rotatively coupled to the air source port 106 and a transfer end 130 that is operative to rotate into an adjacent position with any one of the inlet/outlet ports. Generally, a motor (not shown) is interconnected proximate to the head end of the transfer tube 124 that is operative to rotate the tube utilizing, for instance, sprockets, gears, etc.

In operation, the transfer end 130 of the transfer tube 124 is positioned adjacent to one of the inlet/outlet ports 108A and air flow is initiated into the transfer unit 12 (e.g., a blower may provide airflow in a first direction) such that a carrier 50 may drawn into the transfer unit 12 via the connected port 108A. The carrier 50 moves into the transfer tube 124 until it reaches a stop 126 that extends into the bore of the transfer tube 124 and impedes movement of the carrier 50. The offset transfer end 130 of the transfer tube 124 may then be rotated to an adjacent position with any one of the four inlet/outlet ports (e.g., port 108D). See FIG. 4C. At this time, air flow may be reversed (e.g., a blower may provide air flow in a second direction) to expel the carrier through the transfer tube and out of the connected port 108D.

As can be seen, the turn-around transfer unit 12 of FIGS. 4A-4C allows for handing a single carrier at a time. That is, there is no means for receiving and handling multiple carriers during a single transport cycle. Such functionality is provided in one embodiment by the turn-around transfer unit of FIGS. 5A-C and 6.

Figure 5D:
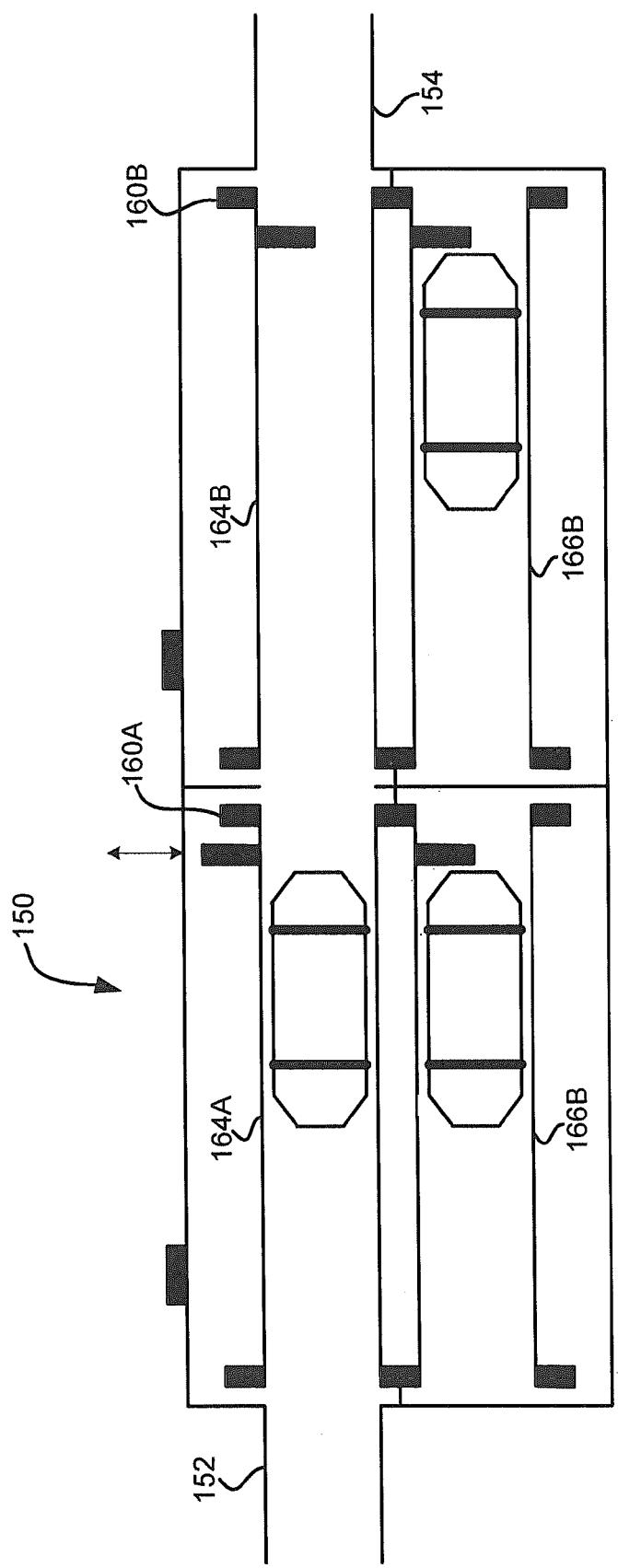
FIG. 5D illustrates a second embodiment of a carrier sequencing device.
Figure 6:
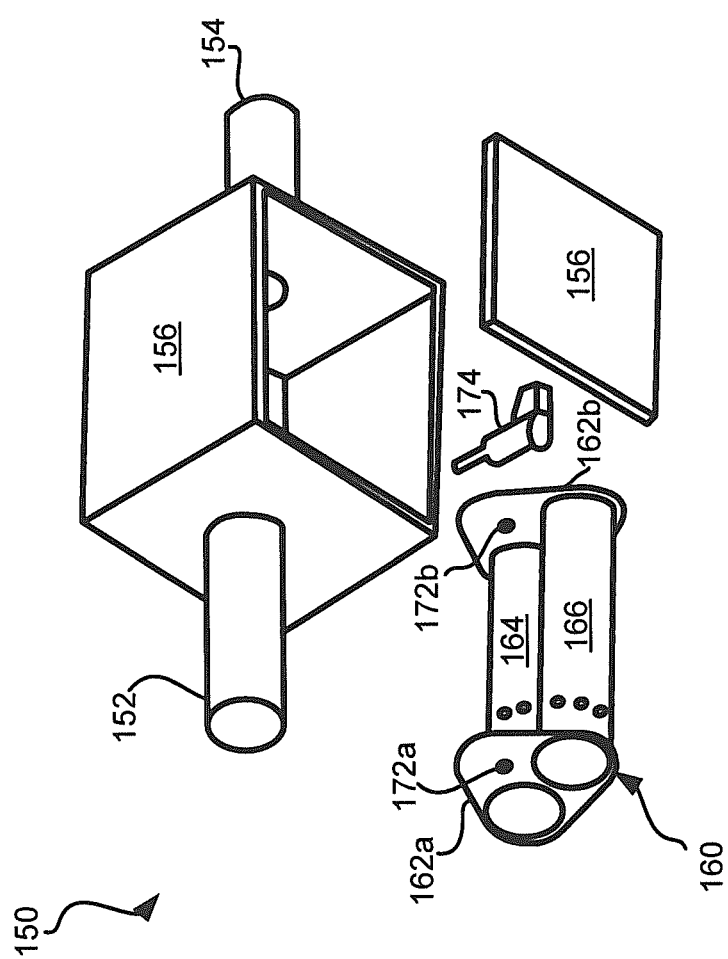
FIG. 6 illustrates an exploded perspective view of the sequencing device of FIGS. 5A-5C.

Specifically, FIGS. 5A through 5C illustrate a turnaround transfer unit 140 that is operative to handle multiple carriers. Generally, the turnaround transfer unit 140 is formed of a diverter 142 and a sequencer or carrier handling device 150. FIG. 6 provides an exploded view of the carrier handling device 150. The diverter 142 is substantially similar to the turnaround transfer unit described in FIGS. 4A through 4C above. In this regard, it will be appreciated that the transfer unit may interconnect multiple input output ports 108A-N to a single head import 132 via an offset transfer tube 124. Unlike the transfer unit 12 discussed in relation to FIGS. 4B and 4C, the present diverter 142 does not include a stop located within the transfer tube 124 and carriers that enter through one of the inlet outlet ports 108 are operative to pass entirely through the diverter 142 and out the head end port 132. Interconnected to the head end port 132 is a carrier port 152 of the carrier handling device 150. Accordingly, carriers passing through the diverter 142 may pass directly into the carrier handling device 150 via the carrier port 152. The carrier port 152 is fluidly interconnected to a housing 156 which is fluidly interconnected on an opposing end to an air source via an air source port 154. The air source is operative to provide bidirectional air flow through the carrier handling device 150, the diverter 142 and into and from the pneumatic tube system.

Disposed within the housing 156 is a carriage 160 that supports at least first and second carrier docks 164, 166. The carrier docks 164, 166 are formed of lengths of tubing that are supported between first and second ends 162A, 162B of the carriage 160. The carriage 160 is interconnected within the housing 156 via first and second pivots 172A, 172B. Accordingly, a motor 174 is provided that is operative to rotate the carriage 160 about the pivots 172A, 172B. In this regard, the carriage 160 is operative to align each of the carrier docks 164, 166 with the carrier port 152. Accordingly, this allows for aligning one of the carriage docks (e.g., 164) with the carrier port 152 in order to receive a first carrier 50A. This is illustrated in FIG. 5A. During such an operation, the air source (not shown) may provide airflow into the transfer unit 142 and into the carrier handling device 150 such that the carrier may pass into the carrier dock 164. That is, the carrier 50A may proceed into the carrier dock 164 until it engages a stop 168 located on the distil end of the carrier dock 164. This stop 168 extends into the bore of the carrier dock 164 to impede passage of the carrier 50A there through.

Once the first carrier 50A is received within the carrier dock 164, a gripper 170 that extends through a sidewall of the carrier port 164 may be moved into contact with an outside surface of the carrier 50A to maintain the carrier locked within the carrier dock 164. However, this is not a requirement. Once the first carrier 50A is located within the first carrier port 164, the carriage 160 may rotate about the pivots 172A, 172B to align the other carrier dock 166 with the carrier port 152. This is illustrated in FIG. 5B. Likewise, a second carrier 50B may be received in the second carrier dock 166 by the carrier handling device 150 once so aligned.

Once the carrier handling device 150 has received two or possibly more carriers, those carriers may be displaced from the carrier handling device 150 via the application of airflow in an opposing direction as illustrated in FIG. 5C. Further, the order in which the carriers 50A, 50B are received may be altered. That is, depending on where the carriers are slated for delivery, the carriage 160 may rotate to deliver one of the carriers prior to delivery of another of the carriers. Likewise, if both carriers are slated for delivery to a common location (e.g., a downstream zone) a first carrier may be launched through the diverter 142 and the second carrier may be rotated into position with the carrier port 152 and launched sequentially after the first carrier. In this regard, two carriers may be delivered through commonly aligned pneumatic tubes. Furthermore, the system may be operative to delay release of a second or subsequent carrier in order to provide desired spacing between the carriers. In this regard, a first carrier may be delivered to a first location while the second carrier is in motion thereby providing enough time between the arrivals of the first carrier to alter an alignment of a downstream transfer unit to allow delivery of the second carrier to a second location.

Though discussed herein as utilizing a carriage 160 having first and second carrier docks 164, 166, it will be appreciated that in other embodiments, more carrier docks may be included. That is, the carriage may include three, four, five, six or more carrier docks that are each configured to receive a separate carrier and which may be selectively rotated into alignment with the carrier port 152. Further, as illustrated in FIG. 5D, the carrier handling device may further incorporate first and second carriages 160A, 160B, which may each include multiple carrier docks 164A, 166A and 164B and 166B, respectively. In such an arrangement, carriers may be selectively received in the carrier docks of separate carriages such that, for example, carriers having common destinations may be aligned and expelled from the carrier handling device together (i.e., as a train of two carriers). Such functionality may be especially valuable when numerous carriers are sent to a common location (e.g., hospital lab).

Figure 7:
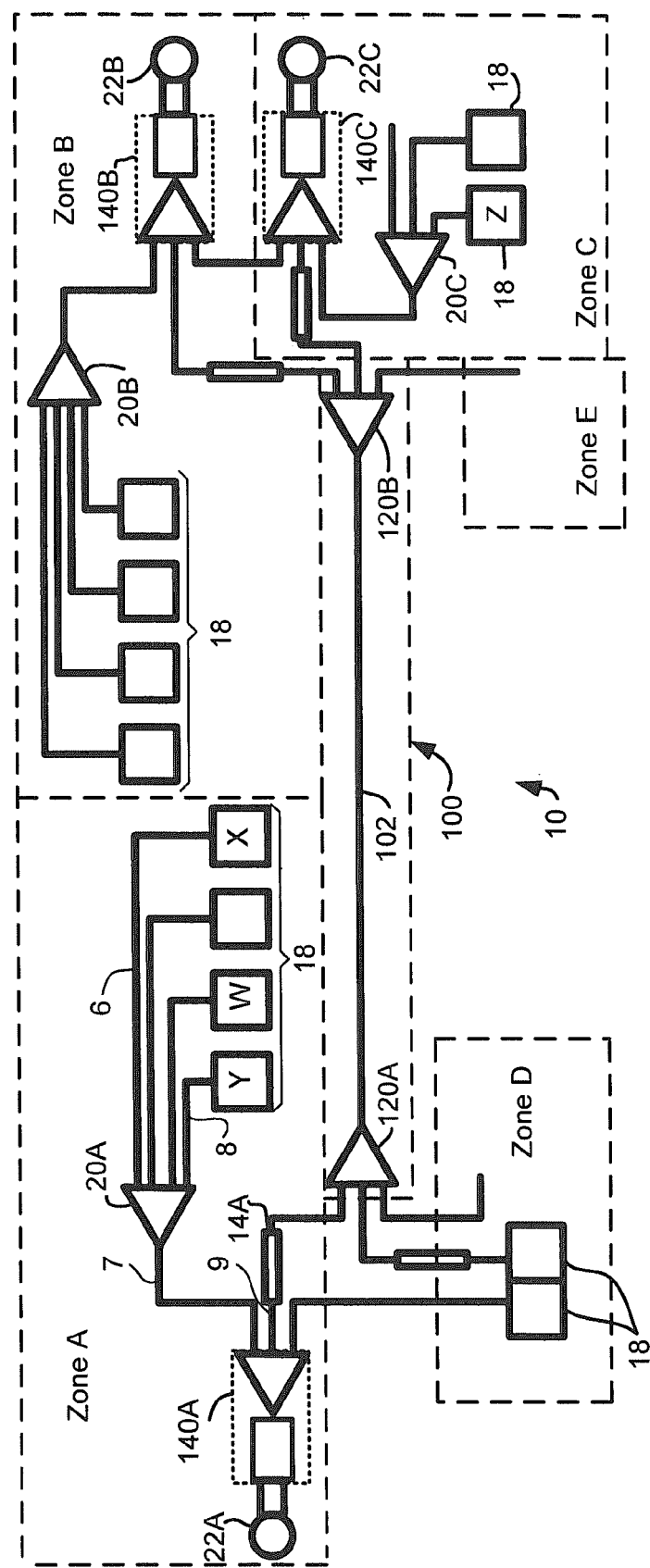
FIG. 7 illustrates another pneumatic tube system utilizing transfer units and carrier sequencing devices.

FIG. 7 illustrates the pneumatic tube system of FIG. 1 with the prior art turnaround transfer units 12 replaced with multicarrier handling turn-around transfer units 140. Returning the example discussed above, two stations in Zone A, 18X and 18Y, are identified as having carriers ready for dispatch. The system controller 30 (see FIG. 2) is operative to identify the intended destination for each of these carriers. For instance, it may be determined that the carrier from Station 18X is intended for delivery to Zone C and the carrier from the Station 18Y is intended for delivery to Zone B. Accordingly, it may be determined that there is an overlap of the travel paths of the carriers and handling both carriers in a single vacuum and pressure cycle is desirable.

The system controller operates to interconnect the transfer unit 20A to a first of the Stations (e.g., Station 18X) and aligns the transfer unit 142 of the multiple carrier handling transfer unit 140A to provide a pneumatic path between the turnaround transfer unit 140A and pass-through transfer unit 20A. At this time the air source or blower 22a provides vacuum such that the carrier is drawn out of Station 18X. Once the carrier is identified as passing through the transfer unit 20A (e.g., using RFID, bar code etc.), the transfer tube of the transfer unit 20A may be aligned with the Station 18Y in order to begin transport of the carrier within Station 18Y to the turnaround transfer unit 140A. Though illustrated as having a short pneumatic tube section 7 extending between the pass-through transfer unit 20A and the turnaround transfer unit 140A, it will be appreciated that many instances significant distances exist between the transfer units 20A and the turnaround transfer units 140A. That is, in actual implementations, it is common for all blowers and turn-around transfer units to be co-located in a common location. In this regard, significant distances may exist in the turnaround transfer units and pass through transfer units, interconnecting a plurality of stations.

The ability to identify when the carrier from 18X passes through the pass-through transfer unit 20A allows for redirecting the transfer unit 20A and applying vacuum to station 18Y while the carrier of station 18X traverses the connecting pneumatic tube 7 between the pass-through transfer unit 20A and the turnaround transfer unit 140A. That is, both carriers may be in motion towards the turnaround transfer unit 140A simultaneously. As will be appreciated, such simultaneous movement of the carriers originally located in Stations 18X and 18Y further reduces the total time to transfer both carriers. Further, the ability to identify the location of the carriers (e.g., utilizing antennas or readers located in the transfer units, stations, tubes etc.) may also allow for providing desired spacings between the carriers. This allows the carrier handling device 150 to receive the first carrier in a first carrier dock and reposition a second carrier dock to receive the second carrier.

Once both carriers are received at the turn-around transfer unit 140A, a carrier path (e.g., inter-zone transfer) between Zone A and the downstream Zones B and C may be established. Initially, in the presented example, the second opposing transfer unit 120B of the inter-zone transfer device 100 is connected to Zone C. At this time, the blower 22A may apply positive pressure and the carrier handling unit 150 may align an appropriate port of the carriage (i.e., holding the carrier destined for Zone C) with the pneumatic path to deliver the carrier to zone C. Accordingly, this carrier may proceed out of the turnaround transfer unit 140 and begin transit to zone C. At this time, the carrier handling unit 150 may realign the second carrier dock with the airflow port such that the second carrier (i.e., destined for Zone B) is disposed within the airflow, thereby, launching the second carrier toward Zone B. As will be appreciated, the controller may delay the alignment and/or release of the second carrier to provide adequate spacing between the carriers such that downstream components may be realigned between the arrivals of the carriers. In any case, the first carrier may transit through the interzone transfer unit 100 and through the transfer unit 120B and into zone C until it is received at TCU 14C. Once received by Zone C, the transfer unit 120B may realign to connect with Zone B prior to the arrival of the second carrier (which may already be in transit) passing through the transfer unit 120B. Accordingly, once the transfer unit 120B is realigned (i.e., during transit of the second carrier) the second carrier may pass through transfer unit 120B and into zone B. As will be appreciated, the ability to handle multiple carriers at the turn-around transfer unit 140A allows for moving two or potentially more carriers during each vacuum cycle and each pressure cycle. Accordingly, the system is more efficiently utilized and the total throughput of the system is increased.

Figure 8:
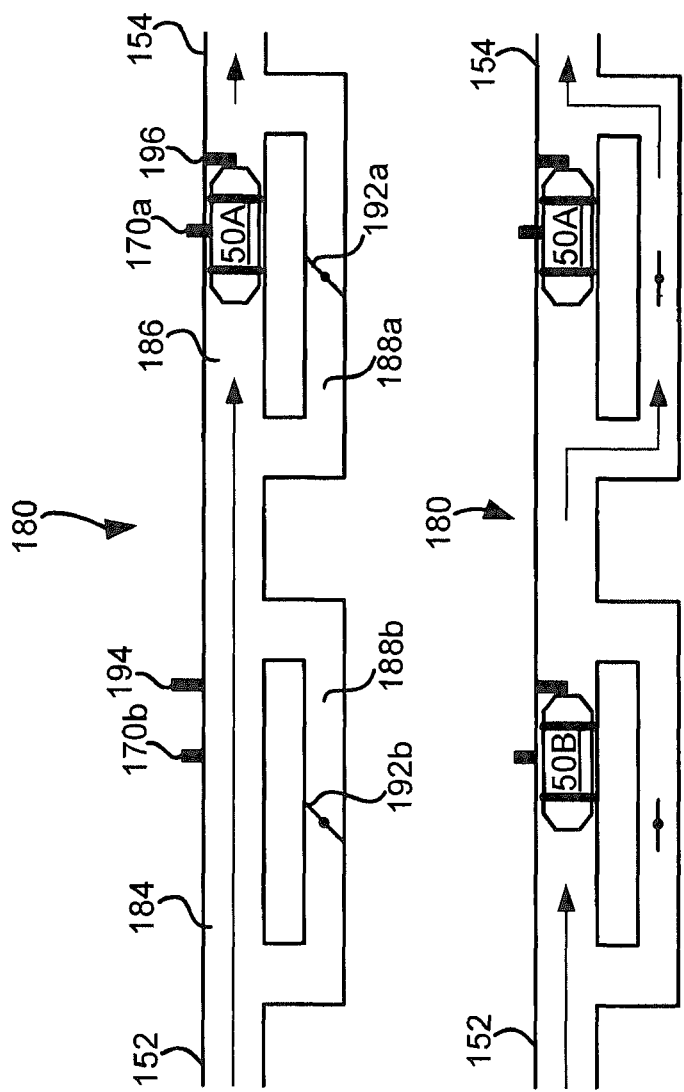
FIGS. 8A-8C illustrates another embodiment of a carrier sequencing device.

FIGS. 8A-8C illustrate a further embodiment of a sequencer or carrier handling device 180. In this embodiment, the carrier handling device 180 is a linear device rather than a rotating device is illustrated in FIGS. 5A-5C. That is, carriers are received and stored in series in first and second (or potentially additional) carrier docks 184, 186. Again, the carrier handling device 180 includes a carrier port 152 that is fluidly connectable to a headend of a diverter (not shown). An opposing end of the carrier handling device 180 includes an air source port 154 that is connectable to an air source, which provides bi-directional airflow through the carrier handling device.

A receiving tube 190 extends between the carrier port 152 and the air source port 154. First and second stops 194, 196 are selectively disposable into and out of the internal bore of the receiving tube 190. These stops 194, 196 define the carrier docks 184, 186 of the carrier handling device 180. For instance, as illustrated in FIG. 8A, the first stop 196 is disposed into the internal bore of the receiving tube 190. Accordingly, a first carrier 50A received within the carrier handling device 180 progresses through the receiving tube 190 until its movement is impeded by the stop 196. At this time, an optional gripper 170 may be utilized to apply a compressive force to the outside of the carrier 50A.

Once the carrier 50A is disposed within the first carrier dock 186, airflow through the internal bore of the receiving tube 190 is effectively blocked. That is, absent bypass around the blockage of the carrier 50A, the air source cannot continue drawing air into or pushing air out of the carrier handling device 180. Accordingly, each dock 186, 196 may further incorporate a bypass duct 188 having first and second ends fluidly interconnected to the internal bore of the receiving tube 190 at locations on opposing ends of each carrier dock. Typically, each by-pass duct 188 is sized to allow airflow, around a stopped carrier within the adjacent carrier dock, that is sufficient airflow for downstream operations of the pneumatic tube system. One exemplary by-pass duct and associated valves for fluidly connecting the by-pass duct to a pneumatic tube is set forth in co-assigned U.S. Pat. No. 8,317,432 the entire contents of which is incorporated herein by reference. Though illustrated showing each carrier dock including a bypass duct, it will be appreciated that the carrier dock located adjacent to the carrier port 152 may be free of such a duct.

Once the carrier 50A is positioned within the carrier dock 186, a valve 192A may be opened within the bypass duct 188 (e.g., at control of the SCC) to allow diverting air around the stopped carrier. See FIG. 8B. Likewise, the second stop 194 may be moved into the internal bore of the receiving tube 190 to allow for receipt of a second carrier 50B in the second carrier dock 184. See FIG. 8B. If necessary, a second valve 192B may be opened within the second bypass duct 188B to allow for airflow around the second carrier 50B for controlling downstream operations. Once multiple carriers are received by the carrier handling device 180, airflow may be reversed through the first bypass duct 188A to expel the second carrier 50B out of the carrier handling device 180. This may further entail closing the second valve 192B in the second bypass duct 188B. See FIG. 8C.

The ability to handle multiple carriers, while increasing system utilization, likewise increases the possibility of misdirecting a carrier. That is, the ability to move different carriers into and out of the airstream during a single airsource cycle increases the potential for transposing the order of carriers and/or releasing an incorrect carrier into an aligned pneumatic path. To alleviate such concerns, the present system utilizes a carrier identification and tracking system as discussed above in relation to FIGS. 1-3. Specifically, the system incorporates antennas or other readers (e.g., optical scanners/bar code readers) at various locations to read identification devices attached to the carriers and/or within the carriers (e.g., attached to the contents). Typically, each multi-carrier turn-around transfer unit will include one or more antennas/readers 40 that allow for identifying a carrier as it is received and/or stored in a carrier dock. Likewise, the carrier may be re-identified prior to its release.

The ability to read the identification devices of the carriers/contents, allows the system controller to identify a transaction record for the carrier and confirm that it is a proper carrier for a current alignment of the pneumatic system. That is, the controller is operative identify a destination location from a transaction record (or stored on the identification device). Based on such identification, the controller is operative to confirm that a current alignment of the pneumatic tube is correct prior to releasing the carrier. Further, the controller is operative to utilize transaction record/destination information to determine if two or more carriers share some or all of a common transport path. Such a determination allows for sending two or more carriers through part or all of a transport path during a single blower cycle. Finally, the ability to identify a location of a carrier, based on the proximity of an identification device relative to a reader, allows for realigning transfer units and/or spacing carriers as they are received and/or dispatched by the turn-around transfer unit. For instance, a first carrier may be identified as it passes through a system component (e.g., tube, TCU, transfer unit, etc.). At such time, a second carrier may be launched into the system and/or one or more system components may be realigned.

Figure 9:
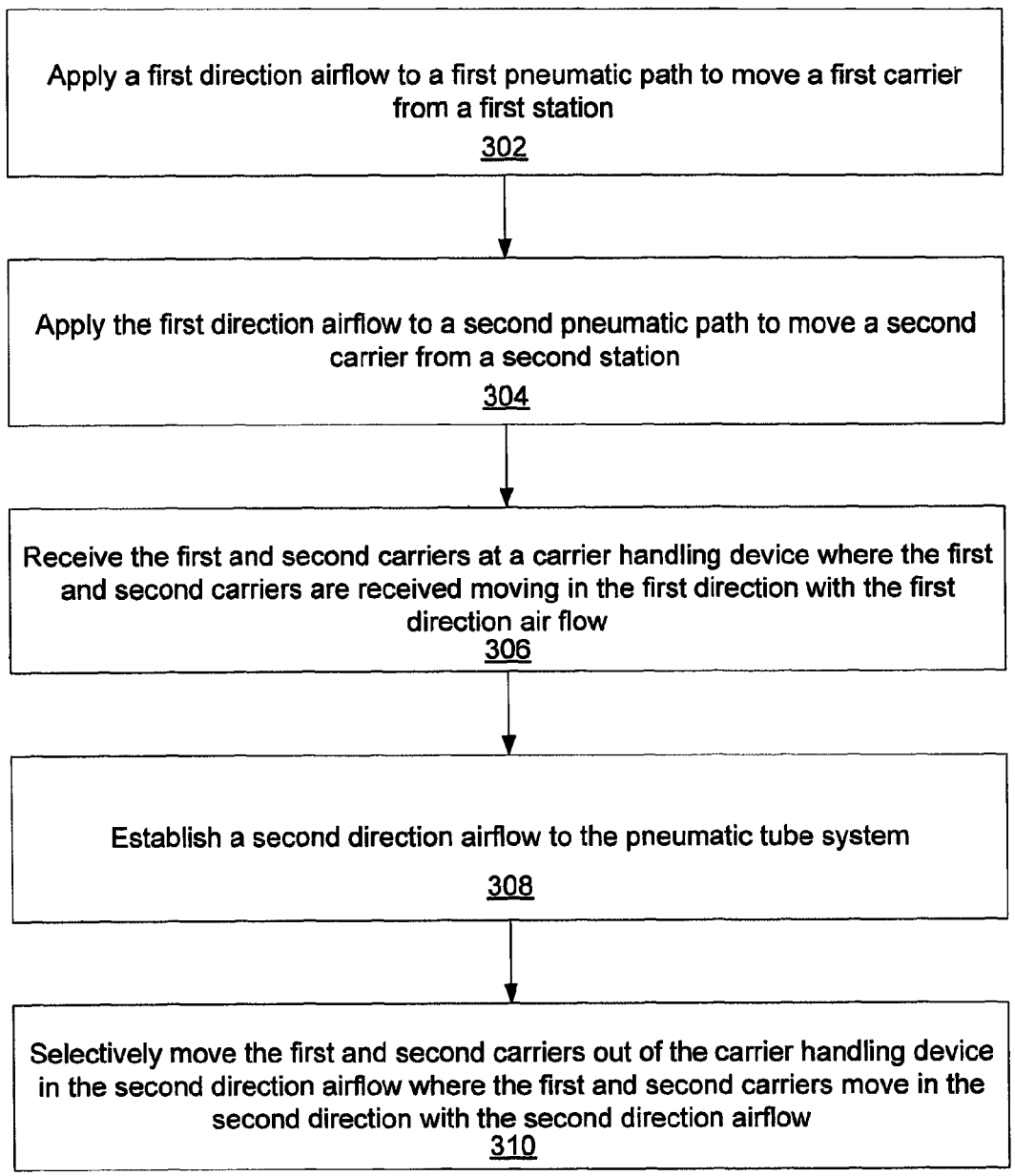
FIG. 9 illustrates a process flow sheet illustrating a process for implementation by a pneumatic tube system.

FIGS. 9-13 illustrate various processes that may be implemented utilizing various aspects of the system described above. Specifically, FIG. 9 illustrates an overall process 300 for moving at least first and second carriers from first and second carrier stations to a carrier handling device during a single air source/blower cycle. Initially, the process 300 includes applying a first direction air flow to a first pneumatic path in order to move 302 a first carrier from a first station. Once the first carrier is in motion from the first station, the airflow may be applied to a second pneumatic path to move 304 a second carrier from a second station. As discussed above, the application of the first direction air flow to first and second stations may entail realigning one or more system components (e.g., transfer units) while the first carrier is in motion and/or after the first carrier is received by carrier handling device. In any case, the first and second carriers are received 306 at carrier handling device where the first and second carriers are moving with the first airflow. That is, the first and second carriers are moved from their respective stations during a common cycle of the air source. Once received within the carrier handling device (e.g., in one or more carrier docks), a second airflow is established 308 in a second direction to the pneumatic tube system. Once the second airflow is established, the first and second carriers may be selectively moved 310 out of the carrier handling device in the second direction air flow such that the first and second carriers may proceed with the second airflow into the pneumatic tube system toward their destination locations. In accordance with the systems disclosed above, the movement of the first and second carriers out of the carrier handling device may further entail aligning one or more carrier docks with the second airflow and/or selectively releasing the carriers to provide a desired spacing there between.

Figure 10:
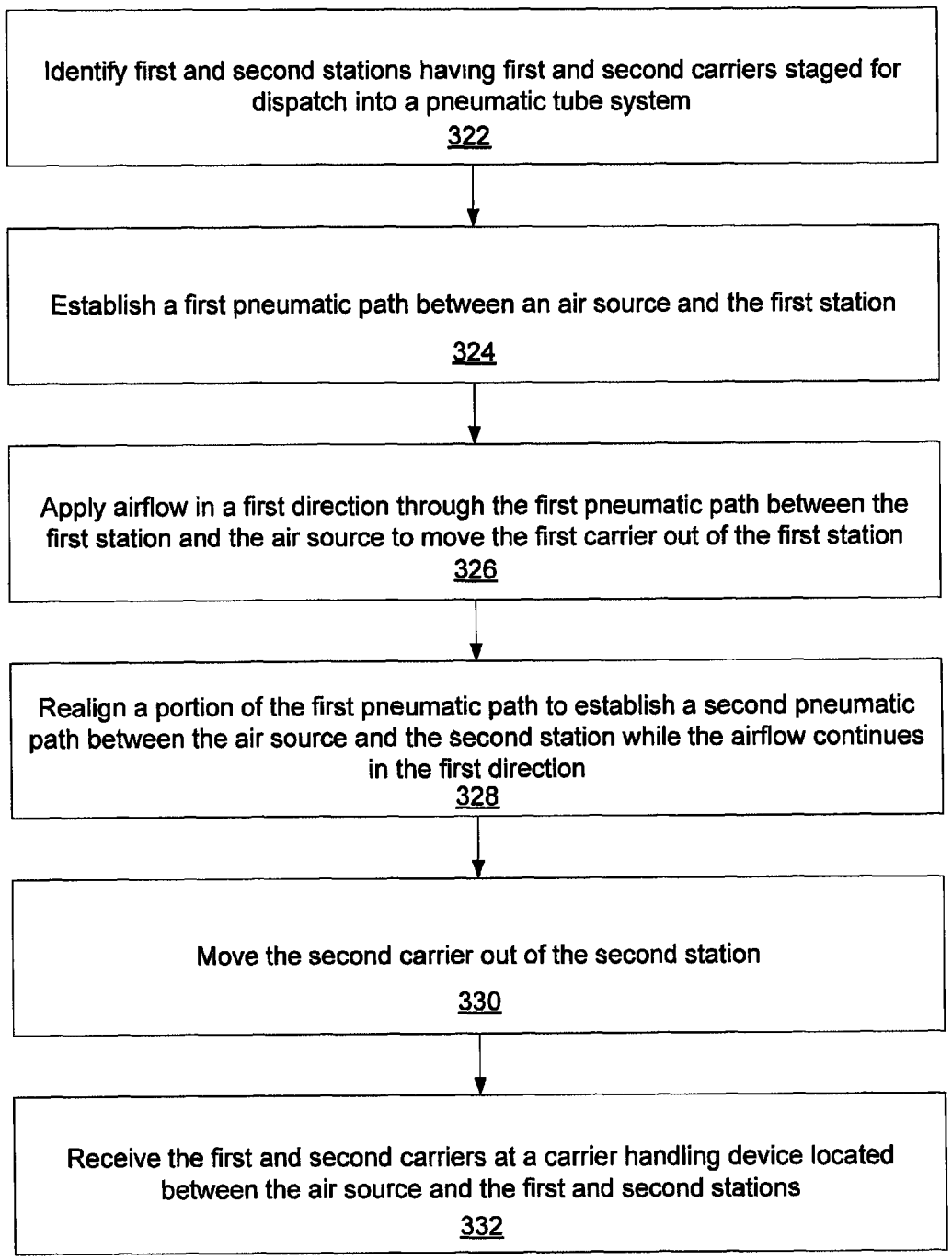
FIG. 10 illustrates a process flow sheet illustrating a process for implementation by a pneumatic tube system.

FIG. 10 further illustrates a process 320 for use in moving at least first and second carriers located in at least first and second carrier stations serviced by a common air source to a carrier handling device. Initially, the system (e.g., system controller) is operative to identify 322 at least first and second stations interconnected to the common air source that have at least first and second carriers staged for dispatch into a pneumatic tube system. Once stations having carriers staged for dispatch are identified, the system is operative to establish a first pneumatic path 324 between an air source and the first station. The system then applies airflow in a first direction 326 to the first pneumatic path between the first station and the air source to move the first carrier out of the first station. Once the first carrier is in transit (e.g., beyond a transfer unit interconnecting the two stations), the system is operative to realign a portion of the first pneumatic path to establish a second pneumatic path 328 between the air source and the second station. The establishment of the second pneumatic path occurs while the airflow continues in the first direction and may occur while the first carrier is in transit. Once the second pneumatic path is established, the second carrier is moved out of the second station 330. The first and second carriers are then received 332 at a carrier handling device located between the air source in the first and second stations.

Figure 11:
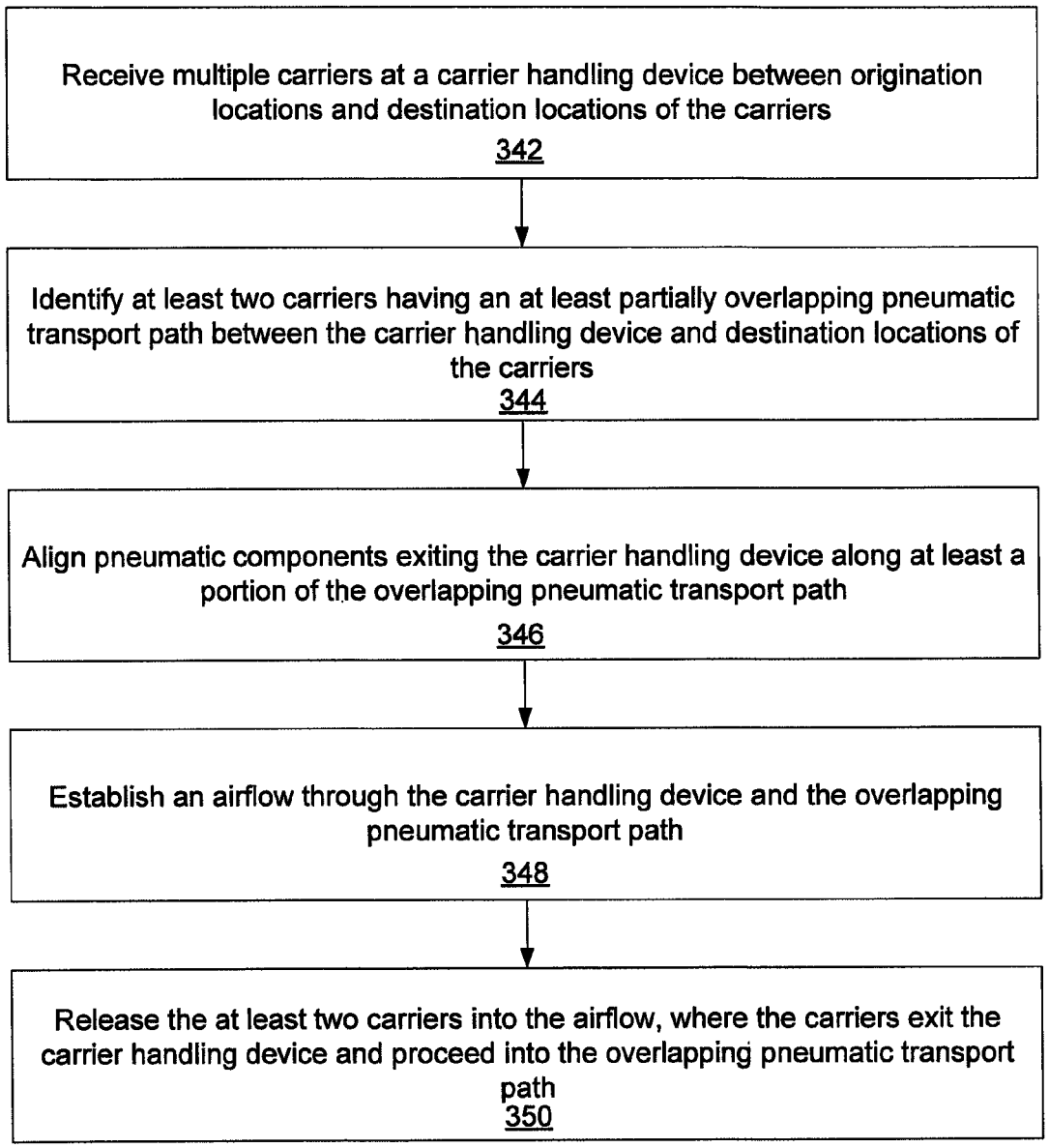
FIG. 11 illustrates a process flow sheet illustrating a process for implementation by a pneumatic tube system.

FIG. 11 illustrates a process 340 for use in moving at least first and second carriers from a carrier handling device within a pneumatic tube system. Initially, the process includes receiving multiple carriers 342 at a carrier handling device that is disposed between the origination locations of the multiple carriers and destination locations of the multiple carriers. Once two or more carriers are received, a controller is operative to identify 344 at least two of the carriers that have at least partially overlapping pneumatic transport paths to their respective destinations. In this regard, identification devices associated with the carriers and/or their contents may be read by a reading device (e.g., antenna, optical scanner, etc.) and transaction records associated with the carriers may be identified to determine destination locations of the carriers. Alternatively, destination information may be read directly from the identification devices or carriers could be received in a known order at the carrier handling device. That is, based on the identification and carrier records of each carrier, as read at the stations or other system components, it is possible to receive the carriers in a known or desired order at the carrier handling device. Upon identifying two or more carriers having an at least partially overlapping pneumatic path between the carrier handling device and the destinations of the carriers, pneumatic components exiting the carrier handling device are aligned 346 to provide the partially overlapping pneumatic path exiting the pneumatic carrier handling device. Airflow is then established 348 through the carrier handling device and through the at least partially overlapping pneumatic transport path. The carriers are then released 350 into the airflow such the carriers exit the carrier handling device and proceed into the overlapping pneumatic transport path. As will be appreciated, the carriers may be sequentially released to provide a desired spacing between each carrier such that, for example, downstream components may be realign between passages of the carriers.

Such a process is further discussed in relation to FIG. 7. In an exemplary embodiment, wherein the carrier handling device 140A includes a three carrier dock rotating carriage, three carries originating from stations 18W, 18X and 18Y in zone A may be received during a vacuum cycle of the blower 22A. Based on the destination information of the carriers, it is possible to dispatch the carriers to reduce system component usage. For instance, if carriers X and Y are destined for Zone C, and carrier W is destined for Zone D, carriers X and Y may be identified as having an overlapping carrier path. Accordingly, during a pressure cycle, a first alignment may be made to send carrier W to zone D and a second alignment may be made to send carriers X and Y to zone C. However, it will be appreciated that all of the carriers may be moved from the carrier handling device during a single blower cycle.

Another important feature that is enabled by the multiple-carrier handling system is the ability to schedule carrier dispatches. That is, in current practice pneumatic tube systems are utilized in an ad-hoc basis where each individual user places a carrier within a carrier station and requests that the carrier be delivered to a destination location/station. Currently, such requests or transactions are handled on a first in first out (FIFO) basis. Further, in some instances, a carrier may be expedited such that it is handled prior to other pending transactions. However, a vast majority of carrier transactions are not time critical. That is, a short delay between the carrier being staged in a carrier station for dispatch and launched into the system is acceptable for most transactions. The ability to move multiple carriers allows multiple users to stages carriers within a single zone for a common dispatch. In this regard, outputs may be provided to the control panels or other user interfaces of carrier stations indicating when the next dispatch will occur: "next dispatch in XX minutes". A user may then load a carrier in the stations, select destination and walk away knowing the carrier will automatically dispatch.

Figure 12:
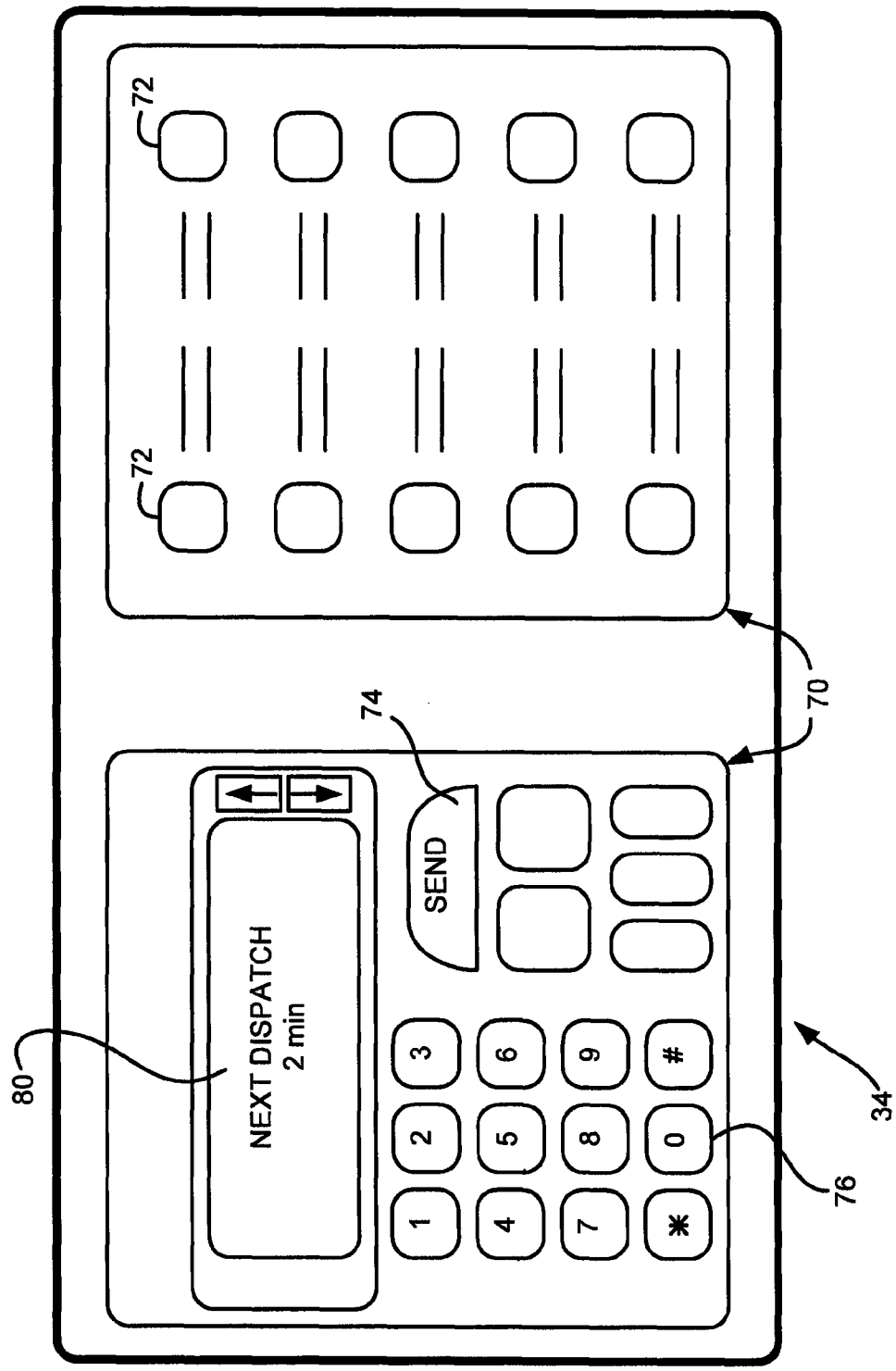
FIG. 12 illustrates a user interface of a carrier station of a pneumatic tube system.

FIG. 12 shows one embodiment of a user interface 34 that may be incorporated into sending/receiving stations 18. As shown, the user interface 34 includes the control panel 70 and a display 80. The control panel 70 includes a number of "speed-dial" buttons 72 that may be programmed to allow a user to insert a carrier 50 into the dispatcher of a station, select a preprogrammed destination station by depressing a corresponding speed-dial button 72, and dispatch the carrier by depressing the send/enter button 74. In addition, the control panel 70 includes a numeric keypad 76 for use in manually entering, for example, destination station information. As shown, the display 80 may display the next dispatch time, thus allowing a user to stage a carrier, enter its destination and leave the carrier unattended knowing that it will be launched into the pneumatic tube system during the next dispatch cycle. Further, such scheduling of dispatch time increases the likelihood that two or more carriers will be handled during each cycle of the air source. This further enhances system utilization.

Figure 13:
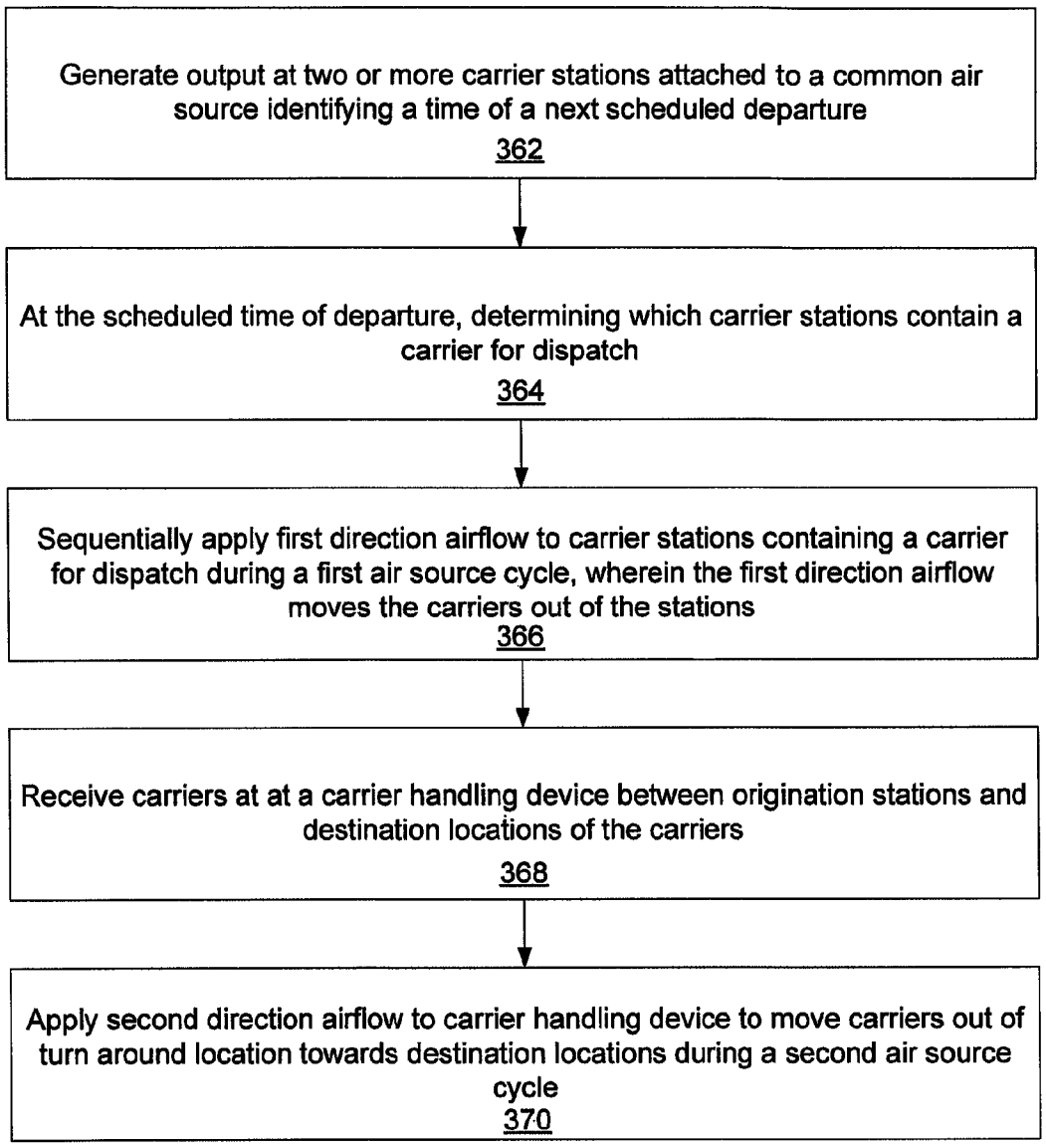
FIG. 13 illustrates a process flow sheet illustrating a process for implementation by a pneumatic tube system.

FIG. 13 illustrates a process 360 that may be utilized for scheduling carrier dispatches. Initially, an output is generated 362 at two or more carrier stations attached to a common air source which identifies a time of the next scheduled carrier departure/dispatch. At the scheduled time of departure, the system controller determines 364 which stations contain a carrier for dispatch. Once the stations are identified as having a carrier for dispatch, the system sequentially applies 366 a first airflow in a first direction to the carrier stations containing a carrier. This airflow moves the carriers out of the carrier stations and into the carrier handling device, during a single blower/air source cycle. The carriers are received 368 at a carrier handling device, which is disposed between the origination stations of the carriers in their destination locations. After receipt in the carrier handling device, a second direction airflow supplied 372 to the carrier handling device to move the carriers out of the device and back into the pneumatic tube system for delivery to their destination locations.

Utilization of a carrier handling device that is operative to handle multiple carriers provides a further benefit for the system. Specifically, the carrier handling device may be utilized to park a first carrier and handle a second higher priority carrier. For instance, in reference to FIGS. 5A-C and 7, if a carrier 50B from station 18Z is launched into the system for delivery to Zone A and is identified as having high priority, it may be desirable to process this transaction prior to processing other transactions. In such an instance, if a carrier 50A is currently being handled by the turn-around transfer unit 140A of zone A, this carrier 50A may be rotated out of the airflow path as illustrated in FIG. 5B. This may allow the receipt of the high priority carrier 50B from Zone C and the immediate re-dispatch of this carrier 50A back into the system for delivery to Zone A. Stated otherwise, the carrier handling device 150 may be utilized to temporarily park a carrier (e.g., 50A) to allow another carrier (e.g., 50B) to bypass the parked carrier.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such or other embodiments and with various modifications required by the particular application(s) or use(s) of the presented inventions. It is intended that the appended claims be construed to include alternative embodiments to the extent permitted by the prior art.

What is claimed:

1. A method for use in operating a pneumatic tube system, comprising:
   operating an air source of a pneumatic tube system (PTS) to provide a vacuum airflow;
   sequentially applying the vacuum airflow to:
      a first pneumatic path established between a first carrier station and the air source to move a first carrier out of the first station and into the first pneumatic path; and
      a second pneumatic path established between a second carrier station and the air source to move a second carrier out of the second station and into the second pneumatic path, wherein the first and second pneumatic paths at least partially overlap and where the vacuum airflow is continuous during the sequential application;
   moving the first and second carriers via the vacuum airflow to a carrier handling device disposed within the PTS between the air source and the carrier stations;
   receiving the first and second carriers at the carrier handling device;
   while said first and second carrier are disposed within the carrier handling device, realigning at least one transfer device of the PTS to establish a third pneumatic path between the carrier handling device and a destination station;
   operating the air source to provide a pressurized airflow to move the carriers out of the carrier handling device and into the third pneumatic path.

2. The method of claim 1, further comprising:
   storing the first and second carriers in first and second carrier docks in the carrier handling device.

3. The method of claim 2, further comprising:
   receiving a first carrier in a first carrier dock; and
   rotating the first carrier dock out of the path of the first direction airflow;
   rotating a second carrier dock into the path of the first direction airflow; and
   receiving the second carrier in the second carrier dock.

4. The method of claim 2, wherein said first and second carriers are simultaneously in motion for at least a portion of their movement between the carrier handing device and the destination station.

5. The method of claim 2, wherein said first and second carriers are simultaneously in motion for at least a portion of the movement between the first and second carrier stations and the carrier handling device.

6. The method of claim 1, wherein sequentially applying further comprises;
   realigning at least one transfer device of the PTS connected to said first and second stations to establish said second pneumatic path between the air source and the second carrier station.

7. The method of claim 6, wherein realignment occurs while the first carrier is in transit between said first carrier station and said carrier handling device.

8. The method of claim 7, further comprising:
   identifying the first carrier moving through the transfer device connected to the first and second carrier stations; and
   realigning the transfer device after the first carrier moves through the pneumatic transfer device.

* * * * *